Patented May 7, 1929.

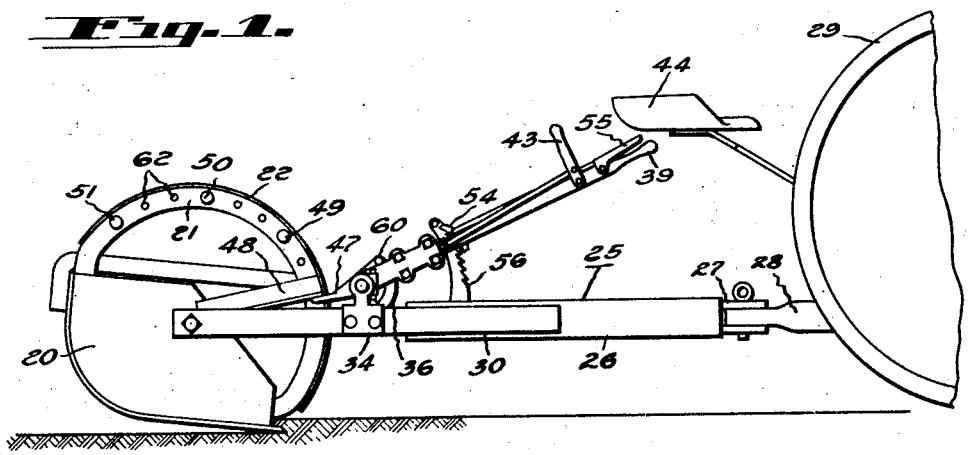

1,711,805

UNITED STATES PATENT OFFICE.

WILLIAM A. PERRY, OF SIDNEY, OHIO.

EARTH-WORKING APPARATUS.

Application filed May 9, 1925. Serial No. 29,093.

This invention relates to earth working apparatus, and particularly to earth working apparatus of the type commonly known as scrapers which are useful in the leveling of land by which the soil may be cut away, transported and dumped.

One of the principal objects of the invention is to provide a scraper in which all operations may be controlled by a single lever structure.

Another object of the invention is to provide a scraper which is simple in construction and so arranged that it may be easily operable by the operator of the tractor or other motive power.

Other objects and advantages will be apparent from the following description taken in connection with the accompanying drawings, in which:

Fig. 1 is a side elevation of the scraper connected with a tractor, the scraper being shown in scraping position;

Fig. 2 is a plan view of Fig. 1;

Figs. 3 and 4 are enlarged details illustrating the construction and operation of the invention; and Fig. 5 is an exploded view showing details of construction of the operating lever.

In the accompanying drawings wherein for the purpose of illustration is shown a preferred embodiment of the invention, the numeral 20 designates a scraper bowl or scoop of well known construction having curved or circular runners 21 provided with shoes 22. Trunnions 23 are mounted upon opposite ends of the scoop 20 and are journaled or mounted for revolution in a draft rigging designated as a whole by reference character 25.

The draft rigging 25 consists of a draft bar or tongue 26 which may be of I beam construction having connecting means 27 at its forward end, by which the draft rigging may be connected to the draft bar 28 of tractor 29 or to other suitable motive power. Secured to the rearward portion of the draft bar 26 are the draft members or hounds 30 and the hound bracing members 31, respectively, which are rigidly secured to the draft bar 26 and to one another in such a manner as to provide a substantial and rigid draft rigging structure. Each of the hound and bracing draft members 30 and 31 have rearwardly extending portions 32 and 33 lying against one another and which are preferably secured together. The rearwardly extending members or arms 32 and 33 at one side of the scraper are spaced from the corresponding members 32 and 33 at the opposite side of the scraper to receive therebetween the scoop 20, as best illustrated in Fig. 2. The pivotal connection between the trunnions 23 and the rearwardly extending side members 32 and 33 of the draft rigging is such that, except for the control mechanism which will be hereinafter described, the scoop 20 is free to revolve in the draft rigging and roll over the ground while the scraper is being drawn by the tractor.

Rigidly secured to the parallel side members 32 and 33 at opposite sides of the draft rigging are uprights or standards 34 having a transverse shaft 35 pivoted therein. This shaft, which is preferably of square section between the standards 34, constitutes the pivot or shaft of the single operating lever which will now be described. Rigidly secured upon the shaft 35 is a sector 36 having a notch on its outer edge at 37. The sector is provided with circular bosses or extensions 38 which form a bearing for operating handle 39 mounted thereon. As best shown in Figs. 1 and 5 the operating handle 39 is forked at its inner end, the forked ends having apertured bosses 40 fitting over the bosses or bearings 38, and the sector 36 being received between the forked ends of the operating handle. The forked portion of the operating handle is preferably made in two parts, as illustrated, the parts being held together by bolts 41. The operating lever carries a spring-pressed dog 42 adapted to be normally urged into engagement with the outer edge of the sector 36 and with the notch 37, which dog may be withdrawn from the notch 37 and held out of engagement by means of a latch or lever 43 to which the dog is connected and which is pivotally mounted on the operating handle 39 and having a handle portion within easy reach of the operator when sitting on the tractor seat 44. It is intended that when the dog 42 is in the notch 37 then the operating handle 39 shall be rigidly and nonrotatably connected with the shaft 35, but when the dog 42 is held out of engagement with the notch 37, then the shaft 35 shall be free to rotate independently of the operating handle 39. Rigidly secured adjacent opposite ends of the rocking shaft 35 and at opposite sides of the scraper or scoop 20 are the short arms 47 of the operating lever, each arm or stop member 47 being adapted to move into the path of the stops or bosses 48, 49, 50 and 51 carried at the ends of the scoop 20.

When the operating handle 39 is rigidly and nonrotatably locked to the shaft 35, as above described, it will be apparent that the handle 39, the shaft 35, and the stop member or lever arm 47 constitute, in effect, a single operating lever which may be rocked about the shaft or pivot 35 to control the rotational movement of the scraper 20 in its bearings. During the forward movement of the tractor, the scraper 20 tends to roll upon the ground, but such rotational movement is arrested by the stop members 47 which are adapted to engage the stops 48, 49, 50 or 51. As shown in Fig. 1, the members 47 are in engagement with the stops 48, and in this position the operating handle 39 serves to control, the scraping and the transporting operation of the apparatus. When the operating handle 39 is raised the short arm or stop member 47 of the lever moves downwardly and, the stops 48 remaining always in contact with the members 47, the scraper is permitted to revolve so that the cutting edge drops into cutting or scraping engagement with the ground as indicated in Fig. 1. By varying the position of the operating handle 39 the angular position of the cutting edge and the depth of cut may be varied as desired, upward movement of the handle 39 increasing the depth of cut, and downward movement of the operating handle 39 decreasing the depth of cut. Movement of the operating handle 39 to its lowest position raises the cutting edge of the scraper out of the ground and rocks the scraper backwardly into its transporting position. A latch 55 mounted upon the operating handle 39 cooperates through a spring pressed pawl 54 carried on operating lever 39 with a notched sector 56 mounted adjacent the operating lever, whereby the operating lever and scraper may be locked in their transporting positions, or in such other positions as may be desired. A spring 57 secured at one end to the fastening device 58 on the draft bar 26, and at its other end to the arm 59 rigidly secured to the shaft 35, tends to rotate the shaft 35 and stop members 47 in a clockwise direction, a stop being provided at 60 to arrest these parts when the stop members 47 are returned to their original position in the path of movement of the stops 48, 49, 50 and 51, and when the notch 37 is opposite the dog 42 and adapted to be engaged thereby, as illustrated in Fig. 3. The sector 36 is provided with a second stop at 61 to prevent excessive rotation of the shaft 35 and sector 36 relative to operating lever 39.

Having transported the earth to the desired location, and it being now desired to dump the same, this may be accomplished by operating the latch 43, which as already explained, serves to break the connection between the operating handle 39 or long arm of the lever, and the stop member 47 or short arm of the lever, so that the shaft 35 and stop member 47 are now free to rotate independently of the operating handle 39. In consequence of the drag on the scraper 20 due to the pull of the tractor and its normal tendency to roll over the ground, the stop 48 will move past the stop member 47, rocking the shaft 35 in so doing, as illustrated in Fig. 4, and thereby permitting the scraper to dump its contents. As soon as the stop 48 is moved past the stop memer 47, the spring 58 returns the latter to its normal position as shown in Fig. 3, in which position the connection between the operating handle 39 and the stop member 47 is re-established by engagement of the spring pressed dog 42 in the notch 37. Stop 49 coming into engagement with the stop member 47, the scraper is arrested in its rotation in what may be termed a spread position, that is, a position in which the scraper bowl dumps its contents gradually and spreads the same along the top of the ground. If desired, the dog 42 may be held in its unlatching position by means of the latch 43 until the stop 49 also has moved past the stop member 47, and the dog 42 may be then caused to engage the notch 37 so as to arrest the scraper bowl with the stop 50 against the stop member 47. In this position of the scraper bowl the contents are dumped more quickly than when the scraper bowl is stopped at 49. And likewise the scraper bowl may be permitted to revolve until the stop 51 engages the stop member 47, such operation of the apparatus resulting in dumping the entire contents of the scraper bowl in one pile. The runners 21 are provided with a series of openings 62 whereby the various adjustable stops 49, 50 and 51 may be secured in any desired position on the runner to secure the desired dumping action. Obviously the stops may be varied in number to meet different conditions of operation.

Whatever may be the position or positions at which the scraper may be arrested for dumping, the scraper may be readily returned to its initial or transporting position by actuating the latch 43 so as to hold the dog 42 out of engagement with the notch 37 until the last stop 51 has passed the stop member 47, after which the dog 42 may be engaged in notch 37 so as to arrest the scraper when the stop 48 comes into engagement with the stop member 47.

From the above it will appear that the present invention provides a revolving type of scraper which is extremely simple and rugged in construction, cheap to manufacture, and easy to operate. The driver of the tractor sitting upon the seat 44 may control all operations of the scraper by means of the operating handle 39. Upward movement of the operating handle 39 serves to lower the cutting edge of the scraper from the carrying or transporting position into the cutting position, and conversely, lowering movement of the handle 39 serves to raise the cutting edge of the scraper into the transporting position. The depth of cut as well as the angle of the cutting edge may be varied at will by varying the extent of movement. Breaking the connection between the arms 47 and 39 of the operating lever through operation of latch 43, in the manner already described, controls the successive movements of the scraper from either the digging or the transporting positions into one of the dumping positions, and from the latter back to the transporting position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an earth working apparatus, a draft rigging, a scraper mounted for revolution in said draft rigging, stop means carried by said scraper, and control mechanism for controlling the position of said scraper, said control mechanism comprising a movable stop member mounted on said draft rigging in the path of said stop means, an operating lever connected with said stop member to control the position thereof for varying the depth of cut, a second lever pivotally connected to said operating lever, said second lever having a handle portion adjacent the operating end of said operating lever, and means operated by said second lever for releasably connecting said operating lever with said stop member for permitting movement of the stop member out of the path of said stop means.

2. In an earth working apparatus, a draft rigging, a scraper mounted for complete revolution within said draft rigging to several operating positions including a scooping position, means comprising a single operating lever for controlling revolution of said scraper into its said several positions, said operating lever comprising a plurality of parts normally rigidly connected with one another, and means carried by said operating lever for breaking the connection between said parts to permit independent movement of one of said parts.

3. In an earth working apparatus, a draft rigging, a scraper mounted for revolution in said draft rigging, stop means carried by said scraper, and controlling mechanism carried by said draft rigging for controlling the operation of said scraper, said control mechanism comprising a rock-shaft, a movable stop member in the path of said stop means and mounted for oscillation with said rock-shaft, a control lever rotatably mounted upon said rock-shaft, and releasable means for rigidly connecting said lever with said rock-shaft for oscillation with said rock-shaft.

4. In an earth working apparatus, a draft rigging, a scraper mounted for revolution in said draft rigging, stop means carried by said scraper, and controlling mechanism carried by said draft rigging for controlling the operation of said scraper, said control mechanism comprising a rock-shaft, a movable stop member in the path of said stop means and mounted for oscillation with said rock-shaft, a sector rigidly connected with said rock-shaft for oscillation therewith, a control lever rotatably mounted upon said rock-shaft, and releasable means operable from said control lever for rigidly connecting said lever with said sector and thereby to said rock-shaft for oscillation with said rock-shaft.

5. In an earth working apparatus, a draft rigging, a scraper mounted for revolution in said draft rigging, stop means carried by said scraper, and controlling mechanism carried by said draft rigging for controlling the operation of said scraper, said control mechanism comprising a rock-shaft, a movable stop member in the path of said stop means and mounted for oscillation with said rock-shaft, a sector rigidly connected with said rock-shaft for oscillation therewith and having a notch therein, a control lever rotatably mounted upon said rock-shaft, a spring-pressed dog carried by said control lever and adapted to engage within said notch in the sector to rigidly connect said lever with the sector and thereby to said rock-shaft for oscillation therewith, means operable from said control lever for disengaging said dog from said notch to permit said sector and rock-shaft to oscillate independently of said control lever to permit movement of said stop member out of the path of movement of the said stop means carried by the scraper, and means to return said rock-shaft and sector into position to be reengaged by said dog after movement of said stop means past the stop member.

6. In an earth working apparatus, a draft rigging, a scraper mounted for revolution in said draft rigging, stop means carried by said scraper, and controlling mechanism carried by said draft rigging for controlling the operation of said scraper, said control mechanism comprising a rock-shaft journaled in said draft rigging, a movable stop member in the path of said stop means and mounted for oscillation with said rock-shaft, a sector connected with said rock-shaft for oscillation therewith, said sector having a boss with an outer cylindrical surface surrounding said rock-shaft, a control lever rotatably mounted upon said boss, and releasable means for rigidly connecting said lever to said sector and thereby to said rock-shaft for oscillation with said rock-shaft.

7. In an earth working apparatus, a draft rigging, a scraper mounted for revolution in said draft rigging, stop means carried by said scraper, and control means carried by the draft rigging for controlling the operation of the scraper, said control means comprising a rock-shaft, a stop member carried by said rock-shaft for oscillation therewith and adapted for positioning in the path of movement of said stop means on the scraper to control the revolution of said scraper in the draft rigging, and a two-part operating arm for controlling the oscillation of said rock-shaft, said operating arm including a portion mounted upon said rock-shaft for oscillation therewith, and a second portion pivotally connected to said first portion and releasable means for connecting said portions to form a rigid operating lever.

In testimony whereof I hereto affix my signature.

WILLIAM A. PERRY.